United States Patent Office 3,816,491
Patented June 11, 1974

---

3,816,491
HEXAMETHYLTUNGSTEN
Geoffrey Wilkinson, London, England, assignor to E. I. du Pont de Nemours and Company, Wilmington, Del.
No Drawing. Filed Feb. 2, 1973, Ser. No. 329,153
Int. Cl. C07f 11/00
U.S. Cl. 260—429 R        3 Claims

ABSTRACT OF THE DISCLOSURE

Hexamethyltungsten is a red crystalline solid which is extremely volatile. In the absence of air at about 50° C. it decomposes rapidly to yield metallic tungsten. It is therefore useful as a metallizing agent for materials which are sensitive to higher and more conventional metallizing temperatures.

BACKGROUND OF THE INVENTION

Field of the invention

This invention relates to hexamethyltungsten and its preparation.

Description of the prior art

Alkyls of the transition metals are often thermally unstable even at room temperature. For example, while $Ti(CH_3)_4$ is known, it decomposes even at 0° C. To increase the stability of the metal-alkyl bonds it is frequently necessary to use additional stabilizing ligands ($L=R_3P$, CO, etc.) to fill the coordination sites, as in compounds of the type $Ti(CH_3)_4L_2$. Certain aralkyl complexes such as tetrabenzyltitanium, $Ti(CH_2\phi)_4$, offer increased stability to the metal-carbon bond compared to the metal alkyls.

While benzyl derivatives are known for tungsten, e.g. $W_2(CH_2\phi)_6$ as reported by F. Huq et al. in Chem. Commun., 1079 (1971), no compounds are known wherein tungsten (VI) is bonded solely to alkyl groups. Tungsten (VI) methyl compounds are limited to $WCl_5CH_3$ (Thiele and Grahleit, Zeit. Chem., 9, 310, 1969) which is unstable above —15° C.

SUMMARY OF THE INVENTION

There has now been discovered the novel compound hexamethyltungsten, $W(CH_3)_6$. It is a red crystalline solid having a normal melting point of approximately 30° C. and is extremely volatile, subliming readily at —30° C. and $10^{-2}$ mm. Hg. In the absence of air the compound decomposes only very slowly at room temperature, but decomposes rapidly at a temperature of about 50° C. to yield metallic tungsten. The high volatility and the convenient range of thermal stability make $W(CH_3)_6$ useful as an agent for metallizing substrates such as polyethylene which are easily damaged at higher and more conventional metallizing temperatures.

Hexamethyltungsten is characterized with certainty by elemental analysis, by its spectral properties and by its chemical reactivity. It may be obtained and characterized as a crystalline solid or in its dissolved form in such solvents as light petroleum fractions, aromatic hydrocarbons, ethers, carbon disulfide and carbon tetrachloride in which it is quite soluble.

*Mass spectrum:* The highest mass number observed corresponds to the $W(CH_3)_5^+$ ion with normal isotope distribution. Lower mass peaks result from subsequent loss of further methyl groups ranging from $W(CH_3)_4^+$ to $W^+$.

*Infrared spectrum:* Solutions of $W(CH_3)_6$ show absorption at 482 cm.$^{-1}$ assigned to W—C stretching frequency, as well as the peaks expected for $CH_3$ vibrations, viz. C—H stretching at 2980 and 2870 cm.$^{-1}$, C—H deformation at 1395 and 1090 cm.$^{-1}$ and $CH_3$ rocking at 800 cm.$^{-1}$.

*Electronic spectrum:* Absorption rising into the U.V. is presumably due to an intense charge transfer band which accounts for the deep red color of the compound.

*N.M.R. spectrum:* The $^1H$ spectrum in deuterotoluene shows a single sharp signal at $\tau$ 8.38 with satellites due to $^{183}W$ coupling, $J$ ($^{183}W$—H) =3.0 Hz. The peak remains sharp on cooling to —90° C. The $^{13}C$ spectrum in deuterobenzene shows a single peak 1000 Hz. upfield from the solvent peaks, with satellites $J$ ($^{183}W$—$^{13}C$) =400 Hz.

*Chemical reactivity:* $W(CH_3)_6$ is spontaneously flammable in air and must be handled in systems and solvents which are rigorously degassed and air-free. The methoxide, $W(OCH_3)_6$, is a frequent product of such reactions with oxygen.

With hydrogen $W(CH_3)_6$ in light petroleum solution is rapidly reduced to an unstable blue species, presumably containing pentavalent tungsten. With water and with strong acids such as $CF_3SO_3H$, $CF_3COOH$ and $H_2SO_4$ methane is given off. With methanol and phenol the corresponding $W(OCH_3)_6$ and $W(O\phi)_6$ are produced.

Hexamethyltungsten reacts rapidly with carbon monoxide and nitric oxide to give complex products. The reaction of $W(CH_3)_6$ with CO and with $H_2$ is inhibited by the presence of tertiary phosphines apparently due to the competitive formation of phosphine adducts. The rapid reactivity of $W(CH_3)_6$ with oxygen, hydrogen, carbon monoxide and nitric oxide when dissolved, for example in xylene, make it useful for purification of inert gases from many reactive impurities.

The process for preparing $W(CH_3)_6$ comprises reacting $WCl_6$ in diethyl ether under substantially air-free and anhydrous conditions with about 3 equivalents of methyllithium at a temperature in the range of about 0° C. to about 30° C. It is to be understood that about 3 equivalents is intended to include ratios down to just above 2 and ratios up to just below 4.

The relative proportions of $WCl_6$ and $LiCH_3$ appear to be critical to the yield of $W(CH_3)_6$. Best yields are obtained using three equivalents of $LiCH_3$ ($WCl_6$:$LiCH_3$ mole ratio of 1:3). If only two equivalents of $LiCH_3$ are used, unstable products containing some chlorine are obtained. If more than four equivalents are used, no $W(CH_3)_6$ is isolated from the products. Using the preferred ratio of three equivalents of $LiCH_3$ yields of up to 50% $W(CH_3)_6$ based on tungsten can be obtained. It is particularly surprising that the use of six equivalents, according to the expected stoichiometry

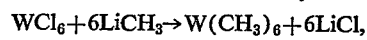

$$WCl_6 + 6LiCH_3 \rightarrow W(CH_3)_6 + 6LiCl,$$

fails to provide the novel products of the invention.

The use of diethyl ether as the reaction medium also appears to be essential to the success of this reaction. With tetrahydrofuran or a light petroleum fraction as solvent the reaction has not produced an isolatable methyltungsten species.

The reaction temperature should not exceed about 30° C. to avoid undue thermal decomposition of the product. On the other hand, at temperatures well below 0° C. reaction may be incomplete or so slow as to be inconvenient. It is preferred to first combine the reactants at subzero temperatures and then to gradually warm to about room temperature in order to complete reaction.

By-products in the formation of $W(CH_3)_6$ such as LiCl are also soluble in the ether solution. The substantially pure product $W(CH_3)_6$ may be obtained by first removing the ether by vacuum evaporation at 0° C. and subsequently raising the temperature to about room temperature in order to sublime the product which can be conveniently condensed on a cold surface (e.g. at Dry Ice temperature, —78° C.) as a red oil containing traces of ether. In order to obtain crystals of improved purity it is preferred to replace the evaporated ether first by a light petroleum fraction, filter and then remove the solvent from the filtered solution by vacuum evacuation at −20° C. The residue may then be sublimed at room temperature and collected as a pure crystalline red solid on a surface cooled to about −10° C.

The solid can be stored under purified nitrogen or in vacuum at temperatures around −40° C. without any significant decomposition; thermal decomposition of the solid is very slow even at room temperature. Dilute solutions in the solvents cited above are quite stable and are readily handled at room temperature in the absence of air.

The following example illustrates a preferred method of producing $W(CH_3)_6$.

EXAMPLE

Because of the extreme reactivity of the reactants and products with moisture and air, all operations are carried out in a vacuum system or under oxygen-free nitrogen. All solvents are dried and degassed before use. Tungsten hexachloride was sublimed under chlorine before use. Methyllithium was used as an approximately one molar solution in diethyl ether prepared from methyl bromide and lithium.

An ether solution of methyllithium was gradually added over a period of 30 minutes to a suspension of tungsten hexachloride (12 g., 30 mmoles) in diethyl ether at −20° C. The solution became dark red as the amount of methyllithium reached about 60 ml. (60 mmoles). Continued addition first caused a yellow precipitate to form which then turned darker. When 90 mmoles of $LiCH_3$ had been added the precipitate had redissolved to give a green brown solution. Upon warming to room temperature the solution became dark brown. The ether was then removed by evacuation at 0° C. to give a black residue. This residue was extracted with a light petroleum fraction (B.P. 30–40° C.) and filtered. The petroleum solvent was then drawn off by evacuation at about −20° C. When the residue was warmed to room temperature red crystals of the product collected on a cold surface at a temperature of about −10° C. Tungsten analysis by atomic absorption showed the product to contain 67.0% W confirming its stoichiometry as $W(CH_3)_6$ (calculated 68.6% W).

When a small portion of $W(CH_3)_6$ is allowed to volatilize into an evacuated glass tube containing an article made of polyethylene heated to about 50° C., the polyethylene is rapidly coated with a decorative black layer comprising metallic tungsten.

The embodiments of the invention in which an exclusive property or privilege is claimed are defined as follows:
1. Hexamethyltungsten.
2. The process of making hexamethyltungsten comprising contacting hexachlorotungsten with about 3 equivalents of methyllithium at a temperature in the range of about 0° C. to about 30° C. in the presence of diethyl ether under substantially air-free and anhydrous conditions.
3. The process of claim 2 wherein the hexachlorotungsten, methyllithium and diethyl ether are mixed together at subzero temperature and the mixture is then gradually warmed to about room temperature.

References Cited

Bradley: Chemical Communications (1969), p. 1261.
Shortland et al.: J.C.S. Chem. Comm., March 1972, p. 318.

DANIEL E. WYMAN, Primary Examiner

A. P. DEMERS, Assistant Examiner

U.S. Cl. X.R.

117—107.2